United States Patent [19]
Landaal et al.

[11] 4,171,844
[45] Oct. 23, 1979

[54] TAILGATE SHAFT AND LOADING RAMP FOR PICK-UP TRUCKS

[76] Inventors: Calvin L. Landaal; George Spector, both of, c/o 3615 Woolworth Bldg., 233 Broadway, New York, N.Y. 10007

[21] Appl. No.: 811,691
[22] Filed: Jun. 30, 1977
[51] Int. Cl.² .............................................. B62D 33/02
[52] U.S. Cl. .................................... 296/57 R; 296/59
[58] Field of Search ................... 296/57 R, 58, 59, 61
[56] References Cited

U.S. PATENT DOCUMENTS

| 470,465 | 3/1892 | Bennett | 296/59 |
|---|---|---|---|
| 531,747 | 1/1895 | Peterson | 296/59 |
| 633,756 | 9/1899 | Douglas | 296/59 |
| 3,010,760 | 11/1961 | Trautmann | 296/57 R |
| 3,023,042 | 2/1962 | Hill | 296/57 R |

Primary Examiner—Philip Goodman

[57] ABSTRACT

A slide for each end of a pick up truck tailgate; the slide allowing the tailgate shaft to be lifted from a U-shaped cup-portion of the slide, and allowing the shaft to be slid under the truck bed; the bracing arms that normally support the tailgate in a rearwardly horizontal position will in this design support the upper end of the tailgate as the tailgate is horizontally slid underneath the truck bed; the tailgate having a lip at its lower end for holding the shaft in the U-shaped cup when the tailgate is in rearward horizontal loading position.

3 Claims, 6 Drawing Figures

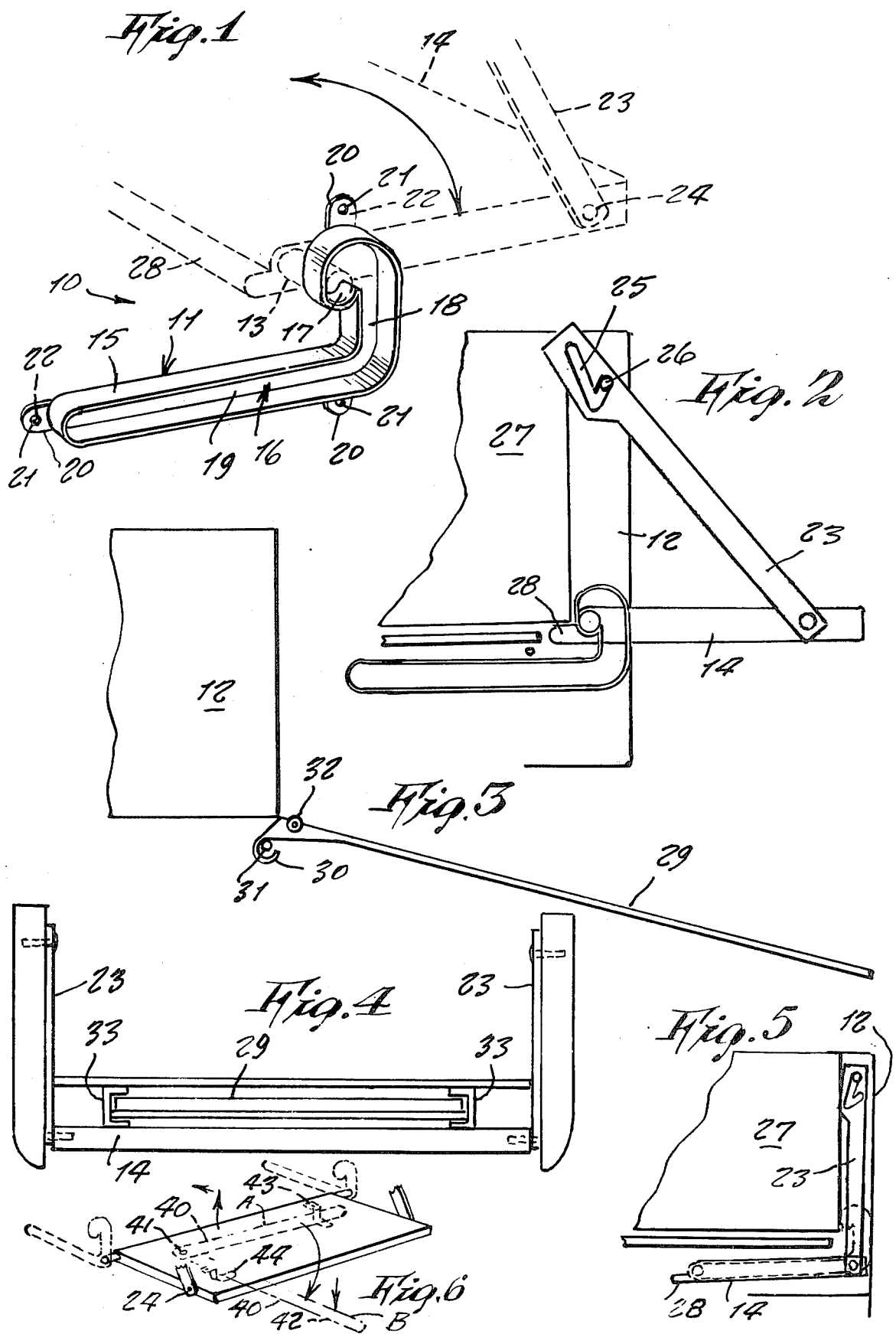

TAILGATE SHAFT AND LOADING RAMP FOR PICK-UP TRUCKS

This invention relates generally to pickup truck tailgates.

A principal object of the present invention is to provide a tailgate shaft slide on each side of a pickup truck for each supporting a shaft about which the tailgate pivots between raised and lowered positions, the slide additionally allowing the tailgate to be slided under the truck bed when the vehicle is backed up for loading, thus allowing the bumper to take the blow in case of striking an object, and thereby not damage the tailgate as often occurs when tailgate extend horizontally rearward and a truck backs up.

Another object is to provide a slide wherein when the tailgate is slided under the truck bed can be used with a ramp to load lawn mowers, garden tractors, snow blowers, refrigerators and the like.

Another object is to provide a tailgate shaft slide wherein when the tailgate is slided under the truck bed, allows a camper to be placed on or removed from the bed without need of removal of the tailgate each time.

Many times a forklift is required and the load is placed on a tailgate. By sliding the tailgate under the bed, another object of the invention is that the load can be properly placed on the tailgate, and the tailgate can then be used to secure the load. If the ramp is not needed for loading, the bumper may be used as a step when the tailgate is under the bed, thus eliminating need to climb over the tailgate to enter on the bed.

Still another object is to provided a tailgate shaft slide which in many instances eliminates need of more than one person to load a heavy object on the bed.

Other objects are to provide a Tailgate Shaft Slide and Loading Ramp for Pickup Trucks which is simple in design, inexpensive to manufacture, rugged in construction, easy to use and efficient in operation.

These and other objects will be readily evident upon a study of the following specification and the accompanying drawings wherein:

FIG. 1 is a perspective view of the tailgate shaft slide.

FIG. 2 is a side view thereof.

FIG. 3 shows a ramp pulled out and aligned with a trailgate edge.

FIG. 4 is a rear view of the vehicle bed showing the lowered tailgate and the ramp over the bar.

FIG. 5 is a side view thereof.

FIG. 6 shows a modified design in which the tailgate includes a pivotable bar stored on its rear side for use as a convenient lever so to easily and effortlessly pivot the tailgate so the tailgate shaft is lifted up into the slide cups or lowered therefrom; the tailgate fulcruming about the arm pivot pins.

Referring now to the drawing in greater detail, the reference numeral 10 represents a tailgate shaft slide according to the present invention wherein a slide member 11 is stationarily moved on each side of a pickup body 12 for supporting a shaft 13 of a tailgate 14.

The slide 11 comprises a rigid metal frame 15 shaped as shown in FIG. 1 by including a central opening 16 surrounded by the frame and which is divided into a cup 17 adjacent one side of a vertical slot 18, and a horizontal slot 19 adjacent a slower end of the slot 18.

Lugs 20 integrally formed with the frame 15 each have an opening 21 for receiving a mounting rivet 22.

A supporting arm or brace 23 is pivotally attached by a pin 24 to each end of the tailgate, the opposite end of the arm having an angle-shaped slot 25 slidable on a pin 26 rigedly secured to the pickup truck body 12. The pin 26 is located rearwardly of a bed 27 placed on the body.

The tailgate includes a lip or flange 28 projecting along its lower edge in order to abut against an underside of the bed, as shown in FIG. 2, when the tailgate is pivoted downwardly from a vertical upright to a horizontal position, with the shafts 13 being supported in the cups 17, as shown in FIG. 2. In this position, for loading upon the tailgate, the lip serves together with the arm to hold the tailgate horizontal. In this position the pin 26 is in a lower end of the slot 25.

In order to get the tailgate under the bed 27 and out of a way, the shafts are lifted out of the cup and moved rearwardly so that they can be slided down the vertical slot 18 and then forwardly in the horizontal slot 19 thus bringing the tailgate under the bed. In order that the distance between pins 24 and 26 may be increased to accomodate the tailgate being at a lower horizontal position than the horizontal position shown in FIG. 2, the arm 23 is raised and then lowered so that pin 26 is brought into an upper end of the slot 25, as shown in FIG. 5 which illustrates the tailgate in the horizontal position under the bed.

In FIG. 3, a ramp 29 is shown attached to the body for moving heavy objects on or off the truck. The ramp includes a tapered hook 30 for hooking on a rigid bar 31 of the truck. The ramp includes a rotatable roller 32 over which heavy object can be rolled when transfered between the ramp and the truck bed. The hook 30 serves to bring the ramp to the height of the bed, and the slight notch uses the weight of the ramp or its load to hold it in position and keep it from sliding. The ramp slides between the frame 33 of the truck when in a stored position, as shown in FIG. 4.

In FIG. 6, a modified design of the invention additionally includes a lever 40 pivotally attached by a rivet 41 to the tailgate 14 so to be pivotable between a stored away position A and an extended position B where the extending end 42 thereof gives greater leverage for pivoting the tailgate about an axis through pins 24 in order to more easily raise the shafts 13 out of the cups 17 when lowering the tailgate so to store it under the bed 27. Thus the lever saves hard labor. A clip 43 serves to hold the lever in stored position, and clip 44 hold it extended.

While various changes may be made in the detail construction, it is understood that such changes will be within the spirit and scope of the present invention, as is defined by the appended claims.

What is claimed is:

1. An adjustable tail gate assembly in combination with a vehicular body having a rear end with said tail gate assembly pivotally mounted on the rear end of said body, including a vehicular bed surface extending to the tail gate with spaced sides enclosing said surface, said tail gate being pivotally mounted to said sides by means whereby said tail gate is pivotable from an upper vertical position to horizontal positions, including a rear storing position, providing a loading surface extending rearwardly beyond said bed surface and a forward loading position beneath said bed surface, said body having a space beneath said bed surface to receive said tailgate, said means comprising a pair of shafts extending laterally from said tail gate toward said sides, further including a pair of slides mounted on said sides receiving said shafts slidably, said slides extending from the rear end of said body forwardly a sufficient distance to receive and support said shafts when the tailgate is in the storing position, further including forward retaining means extending from said tailgate for contact with said body beneath said bed surface when said tailgate is in said loading position, also including rearward retaining means pivotally securing a rear portion of said tailgate to said sides to resist downward pivoting of said tailgate.

2. The combination of claim 1, wherein said slides include an upper pivot bearing for said shafts and a lower storage support connected with continuous slide surface, whereby said shafts can be continuously slid from the bearing to the storage support.

3. The combination as in claim 2, further including means for lifting the shafts from the bearings to permit movement from loading to storage position.

* * * * *